United States Patent Office 3,346,443
Patented Oct. 10, 1967

3,346,443
THERMOSETTABLE RESIN COMPOSITION AND FIBROUS SUBSTRATE IMPREGNATED WITH SAME
Curtis Elmer, Wilbraham, Mass., assignor to Monsanto Company, a corporation of Delaware
No Drawing. Filed Jan. 2, 1964, Ser. No. 335,377
10 Claims. (Cl. 161—184)

ABSTRACT OF THE DISCLOSURE

This application describes a thermosettable composition comprising an admixture of an interpolymer of 20–45 mol percent of an unsaturated polybasic acid or anhydride thereof with 80–55 mol percent of a copolymerizable vinylidene monomer, such as a styrene-maleic anhydride interpolymer; an epoxy compound containing a plurality of epoxy groups; and 1 to 10 weight percent of silica aerogel. The described composition is advantageously employed for a fibrous substrate and forming laminates having improved abrasion and scratch resistance.

---

This invention relates to an improved thermosettable resin composition and particularly to coating and/or impregnating compositions containing same.

In the past the art has attempted to prepare thermosettable resin compositions which contain as the two polymer components (1) interpolymers of a dibasic acid or an anhydride thereof and an interpolymerizable vinylidene monomer and (2) an epoxy compound containing at least two epoxy groups. Typically, such polymer compositions would contain a styrene-maleic anhydride interpolymer as the one component and a polyglycidyl ether of Bisphenol A as the second component. The compositions thus prepared had limited utility and could not be readily fabricated into usable items by conventional processing techniques such as laminating, molding, and the like. It has now been discovered that by admixing silica aerogel with the interpolymer, the hardness and durability of the thermoset product such as a laminate is greatly increased, thereby making the interpolymer commercially useful.

It is an object of this invention to provide an improved thermosettable resin composition.

Another object of this invention is to provide an improved thermosettable resin composition which consists essentially of a mixture of a particularly defined interpolymer of an alpha,beta-ethylenically unsaturated polybasic acid or an anhydride thereof and an epoxy compound with silica aerogel.

Yet another object of the invention is to provide a coating and/or impregnating composition which comprises an organic solvent solution of the improved thermosettable resin composition.

A further object of this invention is to provide laminated structures prepared with the improved thermosetting resin composition.

Other objects and advantages of the invention will be apparent from the following detailed description thereof.

The above and related objects are attained by preparing an improved thermosetting resin composition which consists essentially of (a) a low molecular weight substantially homogeneous interpolymer having polymerized therein (1) 20–45 mol percent of an acid monomer of the group consisting of an alpha-beta-ethylenically unsaturated polybasic acid or an anhydride thereof, and (2) 80–55 mol percent of at least one vinylidene monomer interpolymerizable with said acid monomer (for convenience in the subsequent discussions this interpolymer will be referred to simply as the interpolymer), and (b) an epoxy compound containing a plurality of epoxy groups wherein the improvement comprises admixing with (a) and (b) 1–10 weight percent of silica aerogel based on the weight of resin solids. The interpolymer and the epoxy compound are included in the compositions in proportions such that an average of about 0.2–1.2 epoxy group is provided per carboxyl group of the interpolymer.

The following examples are set forth to illustrate more clearly the principle and practice of this invention to those skilled in the art and they are not intended to be restrictive but merely illustrative of the invention herein set forth. Unless otherwise noted, where parts or quantities are mentioned, they are parts or quantities by weight.

EXAMPLE I

*Part A.*—A monomer solution consisting of 75 parts styrene, 25 parts maleic anhydride, 1.5 parts ditertiary butyl peroxide and 1 part dodecyl mercaptan is prepared. One hundred parts of diethyl benzene are charged to a monomer mixture is then added to the autoclave at a constant rate over a period of 2.5 hours while maintaining the reaction mixture at a temperature of 175° C. The diethyl benzene solvent is then removed from the polymer mixture by vacuum distillation from the autoclave. The molten polymer is removed from the autoclave and placed in a shallow cooling pan. The polymer has a softening point, as determined by the Parr-Bar method, of 125° C. and an intrinsic viscosity of 0.055 as determined in pyridine at 30° C.

*Part B.*—A resin treating composition is prepared by dissolving 100 parts of the interpolymer of Part A above, 36 parts of a diglycidyl ether of Bisphenol A and 0.1 part of lauryl trimethyl ammonium chloride in 91 parts methyl ethyl ketone. The composition is a clear nearly colorless liquid having a viscosity of about 250 centipoises and contains 62% solids. The composition contains 0.4 epoxy groups per carboxyl group of the interpolymer. This resin solution is designated as B.

*Part C.*—A resin treating composition is prepared by admixing with the resin composition of Part B above 6.0 weight percent of silica aerogel based on the weight of the total resin solids. This resin solution is designated as C.

EXAMPLE II

Decorative laminates are prepared employing resin compositions B and C above without the use of an overlay sheet. Decorative print sheets of alpha-cellulose paper are impregnated separately with resin compositions B and C. The treated decorative papers, which are designated as B and C corresponding to the resin employed with each, are dried at about 135° C. to a volatile content of about 3%. The treated decorative papers are found to have a resin pickup of about 60 weight percent based on the weight of the untreated paper.

The treated decorative sheets are then assembled with appropriate layers of core stock, which are sheets of 11 mil kraft paper impregnated with a phenol-formaldehyde resin prepared by reacting 2.0 mols of formaldehyde per mol of phenol under alkaline conditions. No overlay sheet is used. The assembly is then pressed at 200 p.s.i. for about 20 minutes and at a temperature of about 150° C. The samples are released hot from the press.

EXAMPLE III

Decorative laminates are prepared employing an alpha-cellulose overlay sheet impregnated with the resin compositions B and C. The overlay sheets are impregnated separately with resin compositions B and C. The treated overlay sheets are designated as B' and C' corresponding to resin compositions B and C. The treated overlay sheets are dried at 135° C. to a volatile content of about 3%.

They are found to have a resin pickup of about 70% based on the weight of the untreated paper.

The overlay sheets are then assembled with alpha-cellulose decorative print sheets and with appropriate core stock paper as set forth in Example II. The decorative print sheets employed herein are treated with a melamine-formaldehyde resin prepared by reacting 2.5 mols of formaldehyde per mol of melamine. The assembly is then pressed at 200 p.s.i. for about 20 minutes and at a temperature of about 150° C. The samples are released hot from the press.

EXAMPLE IV

The laminate samples of Examples II and III are tested for abrasion resistance and scratch hardness. Abrasion resistance is determined according to NEMA (National Electrical Manufacturers Association) standard test LP-2-2.01. (September 1962) uring the Taber abrasion tester. Scratch hardness is determined using the Taber scratch tester which test is a determination of the weight necessary to make a visible scratch in the surface of the laminate with a diamond tool. The weight is determined in grams. The results of the abrasion and scratch hardness tests are as follows and are the average of three samples each.

TABLE I

| Specimen | Abrasion Resistance (revolution) | Scratch Hardness (grams) |
|---|---|---|
| B (no silica aerogel) | 50 | 125 |
| C (silica aerogel) | 175 | 300 |
| B' (no silica aerogel) | 350 | 125 |
| C' (silica aerogel) | 500 | 250 |

The results show that the minor additions of silica aerogel greatly increase the toughness and hardness of laminates so prepared therewith in comparison to laminates prepared without silica aerogel. The greater the number of revolutions the tougher is the specimen. The greater the weight necessary to cause a visible scratch, the harder is the specimen.

This invention is directed to an improved thermosettable resin composition of matter consisting of a particular interpolymer and an epoxy compound wherein the improvement lies in the admixture thereof with 1–10 weight percent of silica aerogel based on the total weight of the resin solids. It has been surprisingly discovered that by the mere addition of such minor amounts of silica aerogel, laminates prepared therefrom have greatly increased properties of toughness and hardness as noted in the examples. The interpolymer employed in the practice of this invention is substantially a homogeneous interpolymer having polymerized therein (1) 20–45 mol percent of an acid monomer selected from the group consisting of an alpha,beta-ethylenically unsaturated polybasic acid, an anhydride of an alpha,beta-ethylenically unsaturated polybasic acid and mixtures thereof, and (2) 80–55 mol percent of at least 1 vinylidene monomer interpolymerizable with said acid monomer. The epoxy compound employed herein is one containing a plurality of epoxy groups and is present in an amount such as to provide an average of about 0.2–1.2 epoxy group per carboxyl group of the acid monomer.

The silica aerogel employed herein is a low density, finely-divided, porous, white powder. It is prepared from silica aquagels by a unique process which permits drying of the gel without shrinkage of the solid structure. This unique method comprises drying a silica gel at a pressure above the critical pressure of the solvent in the gel. Under these conditions, no shrinkage of the gel occurs and the final product consists essentially of the skeleton of the colloid as it existed in the original undried gel. The method for drying the silica gels may also be said to be a method for replacing the liquid in the gel with air without altering the physical shape of the silica. The aerogels and methods for making them are more fully described in U.S. Patent 2,093,454 to Samuel S. Kistler.

Typical examples of the acid monomers that can be employed in the interpolymer include maleic acid, maleic anhydride, chloromaleic acid, fumaric acid, citraconic acid, citraconic anhydride, itaconic acid and itaconic anhydride.

Typical examples of the vinylidene monomers which can be employed with the acid monomer include mono- and di-olefins such as ethylene, propylene, butene-1, isobutylene, butadiene and isoprene; vinyl halides such as vinyl chloride and vinyl bromide; vinylidene halides such as vinylidene chloride; vinylidene aromatic hydrocarbons and halogenated derivatives thereof such as styrene, vinyl naphthalene, ring-alkyl-substituted styrenes, e.g., o-, m-, and p-methylstyrene, 2,4-dimethylstyrene, ring-halogen-substituted styrenes, e.g., o-, m-, and p-chlorostyrene, 2,5-dichlorostyrene, alpha-alkyl-substituted styrenes, e.g., alpha-methylstyrene, alpha-ethylstyrene; acrylic acid and methacrylic acid esters of 1–18 carbon alkanols, e.g., methyl methacrylate, butyl methacrylate, ethyl acrylate, dodecyl acrylate; acrylonitrile; methacrylonitrile; acrylamide; methacrylamide; vinyl alkyl ketones such as vinyl methyl ketone and vinyl butyl ketone; vinyl alkyl ethers such as vinyl methyl ether and vinyl butyl ether; vinyl esters of 1–18 carbon atom carboxylic acids such as vinyl formate, vinyl acetate, vinyl stearate, and vinyl benzoate; etc. The preferred interpolymers to be employed in the compositions of the invention are interpolymers of maleic anhydride and a vinylidene aromatic hydrocarbon and especially styrene.

The interpolymers employed in the compositions of this invention differ from conventional interpolymers in three important respects. First, the acid monomer and the vinylidene monomer are randomly distributed throughout the polymer chains in the mol ratios previously stated, i.e., 20–45 mol percent of the acid monomer and, correspondingly, 80–55 mol percent of the vinylidene monomer, rather than in a 1:1 mol ratio with the two monomer units regularly alternating in the polymer chain, which structure is a characteristic of the corresponding interpolymers previously reported in the art. Second, the interpolymers are homogeneous and essentially all of the polymer chains have the acid monomer and the vinylidene monomer combined in essentially the mol ratios previously stated. Specifically, the interpolymers are essentially free of (a) co-formed interpolymers in which the acid monomer and the vinylidene monomer are combined in a 1:1 mol ratio with the two monomer units regularly alternating in the polymer chain, and (b) co-formed homopolymers of the vinylidene monomer. Third, the interpolymers have a molecular weight sufficiently low so that the interpolymers have (1) a softening point (as determined by the well-known Parr-Bar method) of less than about 225° C., preferably of less than 205° C. and more especially in the range of 60–180° C., and (b) an intrinsic viscosity of less than 0.5 and preferably less than 0.4 as determined in pyridine at 30° C. Interpolymers having such softening points and intrinsic viscosities have a number average molecular weight of less than about 10,000 and preferably less than about 5,000.

Special polymerization techniques must be employed to prepare interpolymers meeting the requirements of the invention. Preferably such homogeneous interpolymers are prepared by a solution polymerization technique in which the acid monomer and the vinylidene monomer are charged to be polymerization reaction in the molar ratio desired in the ultimate interpolymer. In addition, the monomers are charged to the polymerization medium at substantially the rate at which they will polymerize so that they will polymerize substantially immediately as they enter the polymerization medium. As a result of these techniques, the formulation of the alternating 1:1 interpolymer is avoided.

To obtain an interpolymer having a Parr-Bar softening point and an intrinsic viscosity within the range desired, the polymerization process should be carried out at temperatures above about 80° C. and preferably in the range of 140–180° C. in solvents which function as chain transfer agents. Although a number of solvents can be used for this purpose, it is preferred to employ aromatic hydrocarbons such as xylene, ethylbenzene, diethylbenzene, isopropylbenzene, diisopropylbenzene and the like. It is also desirable to employ relatively large quantities of peroxide polymerization initiators such as benzoyl peroxide and the like, e.g., 0.1–5 and preferably 0.5–2 parts of initiator per 100 parts of monomers. In many cases, it is desirable to use molecular weight regulators preferably from the class of chain transfer agents such as mercaptans, terpenes and the like, e.g., in amounts of up to 10 and preferably 0.5–5 parts per 100 parts of monomers. The polymerization procedure described in the preparation of interpolymers as set forth in Example I, Part A, represents the best mode presently contemplated for preparing the interpolymer component of the compositions of the invention.

The epoxy compound included in the compositions of the invention may be any epoxy compound containing two or more epoxy groups. The preferred epoxy compounds to be employed in the invention contain two or more epoxy groups of the structure:

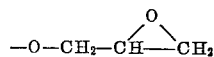

Typical examples of such preferred epoxy compounds include polyglycidyl esters of polybasic acids as disclosed in U.S. 2,866,767; polyglycidyl ethers of polyhydric phenols as disclosed in U.S. 2,467,171, U.S. 2,506,486, U.S. 2,640,037 and U.S. 2,841,595; and polyglycidyl ethers of polyhydric alcohols as disclosed in U.S. 2,538,072, U.S. 2,581,464, U.S. 2,730,427 and U.S. 2,759,269. Especially preferred epoxy compounds are the polyglycidyl ethers of dihydric phenols which have structures which may be represented by the formula:

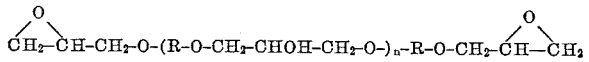

wherein $n$ is an integer of the series 0, 1, 2, 3 . . . , and R represents the divalent hydrocarbon radical of the dihydric phenol.

Other epoxy compounds which can be used in the compositions of the invention include epoxidized drying oils such as epoxidized linseed oil, epoxidized soybean oil and other epoxidized drying oils as disclosed in U.S. 2,569,502; epoxidized polyolefins such as vinyl cyclohexene dioxide, dicyclopentadiene oxide, and divinyl benzene dioxide; epoxidized polyunsaturated monoesters; expoxidized polyunsaturated polyesters as disclosed in published Australian patent application 11,826/55, glycol bis-exodihydrocyclopentadienyl ethers as disclosed in U.S. 2,543,419; epoxidized novolac resins; and epoxidized liquid diene polymers such as expoxidized liquid polybutadiene as disclosed in U.S. 2,946,756. Still other epoxy compounds which can be employed are those disclosed in U.S. 2,992,193, U.S. 2,971,942, U.S. 2,949,438, U.S. 2,938,875, U.S. 2,936,292, U.S. 2,918,439, U.S. 2,917,469, and Belgium 588,068.

The interpolymers and the epoxy compounds are included in the compositions of this invention in ratios such as to provide an average of 0.2–1.2 and preferably 0.4–1.0 epoxy group per carboxyl group of the interpolymer. For the purpose of calculating these ratios, an anhydride group is considered to be the equivalent of two carboxyl groups.

It is usually desirable to employ small quantities of a catalyst to accelerate the reaction between the interpolymer and the epoxy compound. Although diverse types of catalysts can be used for this purpose, it is preferred to employ quaternary ammonium compounds such as lauryl trimethyl ammonium chloride. Other amines such as lutidine, collidine, pyridine, benzylamine, benzyldimethylamine, 1,8-diamino-p-menthane, and N-substituted derivatives thereof obtained by alkylation, such as N,N,N',N'-tetramethyl-1,8-diamino-p-menthane, and N,N'-dimethyl-1,8-diamino-p-menthane, or a polyalkylenepolyamine, including eythylenediamine, diethylenetriamine, triethylenetetramine, etc., also can be employed as catalysts in the compositions of the invention. Tin compounds such as stannous octoate and dibutyl tin di-2-ethylhexoate also can be employed. When the epoxy groups of the epoxy compounds are ring epoxy groups, e.g., as in dicyclopentadienedioxide, it is sometimes desirable to employ Lewis acids as the catalyst, e.g., $BT_3$ or p-toluene sulfonic acid. Where catalysts are employed, they will ordinarily be employed in the range of about 0.1–5.0 and preferably 0.5–2.0% based upon the weight of the interpolymer.

The compositions of the present invention find their primary utility in the formulation and manufacture of impregnating compositions for the manufacture of laminated articles, adhesives and coating compositions.

The impregnating compositions of the present invention with the interpolymers set forth herein comprise an organic solvent solution of the interpolymer and the epoxy compound in the ratios previously described with the silica aerogel suspended therein. The organic solvent included in the compositions may be any of the common solvents which will dissolve both the interpolymer and the epoxy compound. Typical examples of such solvents include the aromatic hydrocarbons, halogenated aromatic hydrocarbons, alcohols, ethers, ketones, esters or any mixture thereof such as xylene-butanol mixtures, ketone-ester mixtures, etc.

Laminated articles can be prepared with the compositions of this invention by impregnating or coating fibrous substrates and advancing the thermosetting resin to an infusible state at elevated temperatures and under pressure. The fibrous substrates may be paper or short fiber woven and non-woven textiles and include natural and synthetic fibers.

In preparing such laminates, the fibrous substrate is usually impregnated with a solution of the interpolymer and the epoxy compound with the silica aerogel suspended therein and heated at temperatures up to about 150° C. to reduce the volatiles content of the impregnated substrate. As the compositions of the invention do not cure at these temperatures, it is possible to reduce the volatiles content to very low levels, e.g., less than 2%. In most cases, it is desirable to impregnate the substrate so that it will contain about 30–80% depending upon the substrate being used and more especially 40–60% for decorative print sheets and 70–85% for transport overlay sheets of resin solids. Thereafter, one or a plurality of plies of the resin impregnated webs are layed up and pressed, e.g., at a pressure of 50–1000 p.s.i. for about 5–60 minutes at an elevated temperature, e.g., 20–200° C. to bond the plies and cure the resin. The laminates so prepared herein may be prepared with or without an overlay sheet. When preparing laminates without an overlay sheet, the print or decorative sheet is impregnated with a resin solids content generally in the range of 40–60 weight percent. The laminates may be prepared using plywood hardboard, particle board, or other dense backup materials or using kraft impregnated core stock paper. In the practice of this invention the overlay and print sheet or just the overlay sheet may be impregnated with the resin composition set forth herein. In addition, the print sheet may be wood veneer.

The compositions of the invention also can be used as adhesives to bond together diverse surfaces such as wood, paper, textiles, metals and the like. In bonding such surfaces together, the surfaces are coated with a mixture of the interpolymer and the epoxy compound and subjected to heat and pressure. The adhesive composition at the glue line may be heated conveniently by dielectric methods.

The above descriptions and particularly the examples are set forth for purposes of illustration only. Many variations and modifications thereof will be obvious to those skilled in the art and can be made without departing from the spirit and scope of the invention herein described.

What is claimed is:

1. An improved thermosettable composition of matter consisting essentially of (a) a substantially homogeneous interpolymer having polymerized therein (1) 20–45 mol percent of an acid monomer selected from the group consisting of an alpha,beta-ethylenically unsaturated polybasic acid, an anhydride of an alpha,beta-ethylenically unsaturated polybasic acid and mixtures thereof, and (2) 80–55 mol percent of at least one vinylidene monomer interpolymerizable with said acid monomer, said interpolymer having said acid monomer and said vinylidene monomer combined throughout the polymer chains in essentially the said mol ratios they are polymerized therein, and (b) an epoxy compound containing a plurality of epoxy groups; said components (a) and (b) being present in a ratio to provide an average of about 0.2–1.2 epoxy group per carboxyl group of said component (a); the improvement comprising in admixture therewith 1–10 weight percent of silica aerogel based on the total weight of the resin solids.

2. The improved composition of claim 1 in which component (a) is an interpolymer of styrene and maleic anhydride, and said epoxy compound contains a plurality of epoxy groups of the structure:

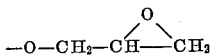

3. The improved composition of claim 1 in which component (a) is a substantially homogeneous interpolymer having polymerized therein (1) 20–35 mol percent of an acid monomer selected from the group consisting of an alpha,beta-ethylenically unsaturated polybasic acid, an anhydride of an alpha,beta-ethylenically unsaturated polybasic acid and mixtures thereof, and (2) 80–65 mol percent of at least one vinylidene monomer interpolymerizable with said acid monomer, said interpolymer having a Parr-Bar softening point of less than about 225° C. and an intrinsic viscosity of less than about 0.5 as determined in pyridine at 30° C.

4. An improved impregnating composition comprising an organic solvent solution of a polymer mixture consisting essentially of (a) a substantially homogeneous interpolymer having polymerized therein (1) 20–45 mol percent of an acid monomer selected from the group consisting of an alpha,beta-ethylenically unsaturated polybasic acid, an anhydride of an alpha,beta-ethylenically unsaturated polybasic acid and mixtures thereof, and (2) 80–55 mol percent of at least one vinylidene monomer interpolymerizable with said acid monomer, said interpolymer having said acid monomer and said vinylidene monomer combined throughout the polymer chains in essentially the said mol ratios they are polymerized therein, and (b) an epoxy compound containing a plurality of epoxy groups; said components (a) and (b) being present in a ratio to provide an average of about 0.2–1.2 epoxy group per carboxyl group of said component (a); the improvement comprising in admixture therewith 1–10 weight percent of silica aerogel based on the total weight of the resin solids.

5. The improved impregnating composition of claim 4 in which component (a) is a substantially homogeneous interpolymer having polymerized therein (1) 20–35 mol percent of an acid monomer of the group consisting of an alpha,beta-ethylenically unsaturated polybasic acid, an anhydride of an alpha,beta-ethylenically unsaturated polybasic acid and mixtures thereof, and (2) 80–65 mol percent of at least one vinylidene monomer interpolymerizable with said acid monomer, said interpolymer having a Parr-Bar softening point of less than about 225° C. and an intrinsic viscosity of less than about 0.5 as determined in pyridine at 30° C.

6. The improved impregnating composition of claim 4 in which component (a) is an interpolymer of styrene and maleic anhydride and component (b) is an epoxy compound containing a plurality of epoxy groups of the structure:

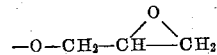

7. A fibrous substrate impregnated with the improved composition of claim 4.

8. A laminate comprising a fibrous substrate impregnated and bonded with the improved composition of claim 1.

9. The laminate of claim 8 in which the fibrous substrate is paper.

10. The laminate of claim 8 in which the fibrous substrate is a woven synthetic textile material.

References Cited

UNITED STATES PATENTS

| | | | |
|---|---|---|---|
| 2,451,410 | 10/1948 | Queeny | 260—38 |
| 2,563,774 | 8/1951 | Debing | 51—298 |
| 2,803,573 | 8/1957 | Hassel | 156—333 X |
| 2,909,740 | 10/1959 | Seidel et al. | 336—90 |
| 2,976,256 | 3/1961 | Whittier et al. | 260—3.3 |
| 3,046,246 | 7/1962 | Muskat | 260—837 X |
| 3,135,643 | 6/1964 | Michl | 161—79 |
| 3,150,116 | 9/1964 | Masters | 260—47 |

EARL M. BERGERT, *Primary Examiner.*

HAROLD ANSHER, *Examiner.*

UNITED STATES PATENT OFFICE

CERTIFICATE OF CORRECTION

Patent No. 3,346,443                      October 10, 1967

Curtis Elmer

It is hereby certified that error appears in the above numbered patent requiring correction and that the said Letters Patent should read as corrected below.

Column 2, line 19, after "to a" insert -- sealed, stirred autoclave and heated to 175° C. The --.

Signed and sealed this 12th day of November 1968.

(SEAL)
Attest:

Edward M. Fletcher, Jr.                   EDWARD J. BRENNER

Attesting Officer                       Commissioner of Patents